March 16, 1954 C. H. WURTZ ET AL 2,672,020

TWO-TEMPERATURE REFRIGERATING APPARATUS

Filed April 28, 1951 11 Sheets-Sheet 1

INVENTOR.
Clifford H Wurtz
BY James W. Jacobs
Willits Hardman and Fehr
attorneys INVENTOR.
Clifford H. Wurtz
James W. Jacobs
BY
Willits Hardman and Fehr
attorneys

TWO-TEMPERATURE REFRIGERATING APPARATUS

Filed April 28, 1951 11 Sheets-Sheet 3

INVENTOR.
Clifford H. Wurtz
James W. Jacobs
BY Willits Hardman and Fehr
Attorneys

TWO-TEMPERATURE REFRIGERATING APPARATUS

Filed April 28, 1951 11 Sheets-Sheet 4

INVENTOR.
Clifford H. Wurtz
James W. Jacobs
BY Willits Hardman and Fehr
attorneys March 16, 1954 C. H. WURTZ ET AL 2,672,020

TWO-TEMPERATURE REFRIGERATING APPARATUS

Filed April 28, 1951 11 Sheets-Sheet 5

INVENTOR.
Clifford H. Wurtz
BY James W. Jacobs
Willits Hardman and Fehr
Attorneys

TWO-TEMPERATURE REFRIGERATING APPARATUS

Filed April 28, 1951 11 Sheets-Sheet 6

INVENTOR.
Clifford H. Wurtz
James W Jacobs
BY Willits Hardman and Fehr
Attorneys March 16, 1954 C. H. WURTZ ET AL 2,672,020

TWO-TEMPERATURE REFRIGERATING APPARATUS

Filed April 28, 1951 11 Sheets-Sheet 7

INVENTOR.
Clifford H. Wurtz
James W. Jacobs
BY Willits Hardman and Fehr
attorneys INVENTOR.
Clifford H. Wurtz
James W. Jacobs
BY
Willits Hardman and Fehr
Attorneys March 16, 1954 C. H. WURTZ ET AL 2,672,020

TWO-TEMPERATURE REFRIGERATING APPARATUS

Filed April 28, 1951 11 Sheets-Sheet 9

INVENTOR.
Clifford H. Wurtz
James W. Jacobs
BY
Willits Hardman and Fehr
attorneys INVENTOR.
Clifford H. Wurtz
BY James W. Jacobs
Willits Hardman and Fehr
attorneys

TWO-TEMPERATURE REFRIGERATING APPARATUS

Filed April 28, 1951 11 Sheets-Sheet 11

INVENTOR.
Clifford H. Wurtz
James W. Jacobs
BY
Willits Hardman and Fehr
attorneys Patented Mar. 16, 1954

2,672,020

UNITED STATES PATENT OFFICE 2,672,020

TWO-TEMPERATURE REFRIGERATING APPARATUS

Clifford H. Wurtz, Oakwood, and James W. Jacobs, Dayton, Ohio, assignors to General Motors Corporation, Dayton, Ohio, a corporation of Delaware Application April 28, 1951, Serial No. 223,550

16 Claims. (Cl. 62—4)

This invention relates to refrigerating apparatus.

An object of this invention is to provide an improved mechanical refrigerator which is adapted to be manufactured in large quantities and to be distributed and used throughout the United States. This refrigerator is refrigerated by a simple compressor, condenser, evaporator system having no controls other than the usual refrigerant expansion device and a compressor cycling control. The refrigerator is provided in its upper portion with a very low temperature frozen food compartment of rectangular cross section adapted to receive rectangular frozen food packages, to be fully packed with them, and to prevent local warm spots among such frozen food packages.

The refrigerator is also provided with an unfrozen food compartment to be maintained at a substantially constant low temperature, above 32° F. regardless of the fluctuations in environment temperatures. This unfrozen food compartment is adapted to receive foods in large quantities which are to be maintained above 32° F. and which are not likely to be dehydrated. The refrigerator also is provided with a space within the unfrozen food compartment in which relatively high humidities are maintained and in which foods may be preserved which are likely to otherwise become dehydrated. Notwithstanding these advantages, the refrigerator is adapted to operate satisfactorily in varying atmospheric temperatures ranging from below 50° to as high as 110°. It is also adapted to operate satisfactorily in varying degrees of atmospheric humidity, frequently reaching substantially the saturation point of 100% relative humidity, without danger of accumulating undesirable moisture within the compartments or within the insulation surrounding the compartments.

To this end, the cabinet is provided with an outer casing which is substantially hermetically sealed throughout and is engaged by the door construction in a manner to reduce the infiltration of outside air into the refrigerator.

The frozen food compartment is virtually surrounded on all sides, except the door side, with a freezing evaporator which is the first or initial stage of the primary evaporating system. This freezing evaporator is placed on the outside of the compartment, and the inner side of the compartment is made smooth to receive the frozen food packages and to be easily scraped of a slight amount of frost which may gather after long periods of use. The construction is such as to provide a large mass in heat exchange relation with the freezing evaporator. This compartment is adapted to be maintained cold without defrosting for relatively long periods of time (several months). Insulation is placed around the frozen food compartment made of hermetically sealed bags of polyethylene containing glass or mineral wool with the surfaces of the bags closely pressed against the outer surface of the frozen food compartment thereby blocking the access of moisture to the freezing evaporator to such an extent that only a slight amount of frost can ever gather on the outer surface of the frozen food compartment (the accumulation of which stops in the early days of operation) and cannot gather at all inside of the bags.

The unfrozen food compartment is also surrounded by similar bags of insulation pressed against the outer surface of the compartment so that no moisture whatever can gather inside the bags, and substantially no moisture can gather on the outer walls of the unfrozen food compartment. The lower portion of the unfrozen food compartment may be surrounded and contacted by a refrigerant pan cooling evaporator which is in closed circuit relationship with a refrigerant condenser cooled by the primary refrigerant evaporating system being described. This space, in the lower part of the unfrozen food compartment, is provided with one or more covered, humidity retaining, food receiving pans or drawers adapted to maintain a space at relatively low temperature and high humidity for storing of green vegetables and the like.

In order to cool the major portion of the unfrozen food compartment, and in order to prevent the accumulation of moisture either inside of the unfrozen food compartment or in the insulation space, a frosting and defrosting evaporator of small mass and holdover capacity is placed inside of the unfrozen food compartment and is preferably in the shape of a vertical rectangular plate, in the upper rear part of the unfrozen food compartment. This frosting and defrosting evaporator constitutes the second stage of the primary evaporator circuit, since it is in series refrigerant flow relationship with the freezing evaporator surrounding the frozen food compartment. The outer surface of the frosting and defrosting evaporator is colder than the outer surface of the pan cooling evaporator and hence continually freezes moisture from the insulation space and prevents any material accumulation within it.

A motor compressor unit and condenser are placed in the lower part of the refrigerator and are in refrigerant flow relationship with the freezing evaporator and the frosting and defrosting evaporator. The compressor is cycled frequently (at least several times a day) to maintain the desired temperature conditions in the refrigerator and this is accomplished by providing a thermostatic switch having its thermostatic bulb in substantial contact with the frosting and defrosting evaporator. The switch starts the compressor when the frosting and defrosting evaporator reaches a temperature above 32° F., such as 36° F. insuring the defrosting of this evaporator. The compressor runs until this evaporator reaches a very low frosting temperature, lower than the temperature of the frozen food compartment, such as 0° F. The construction and relationship of the freezing evaporator and the frosting and defrosting evaporator are such that a large portion of the liquid refrigerant in the frosting and defrosting evaporator is forced, in liquid form, into the freezing evaporator at the beginning of the defrosting cycle, thus reducing the amount of heat and length of time required to defrost the frosting and defrosting evaporator.

This refrigerator is adapted to maintain the frozen food compartment uninterruptedly below 32° F. without defrosting for long periods of time, such as several months, independently of the cycling of the motor compressor unit, which cycling occurs several times a day since the temperature of the liquid refrigerant in the freezing evaporator does not rise above 32° F. even during the defrosting periods. The refrigerator is maintained in proper condition by the automatic defrosting of the frosting and defrosting evaporator, which operation is performed during each idle period of the compressor so quickly that no melting can take place in the frozen food compartment. The refrigerator can operate at very high efficiency in all sections of the country under varying conditions of atmospheric temperature and humidity without becoming frost or moisture bound either within its food preserving compartments or within its insulation space.

It is another object of our invention to provide a household refrigerator in which an above freezing food compartment is maintained at a substantially constant temperature and humidity by a primary evaporating means operating upon a defrosting cycle while adequate substantially constant sub-freezing conditions are maintained by a primary sub-freezing evaporating means.

Further objects and advantages of the present invention will be apparent from the following description, reference being had to the accompanying drawings, wherein a preferred form of the present invention is clearly shown.

Figures 20, 21:
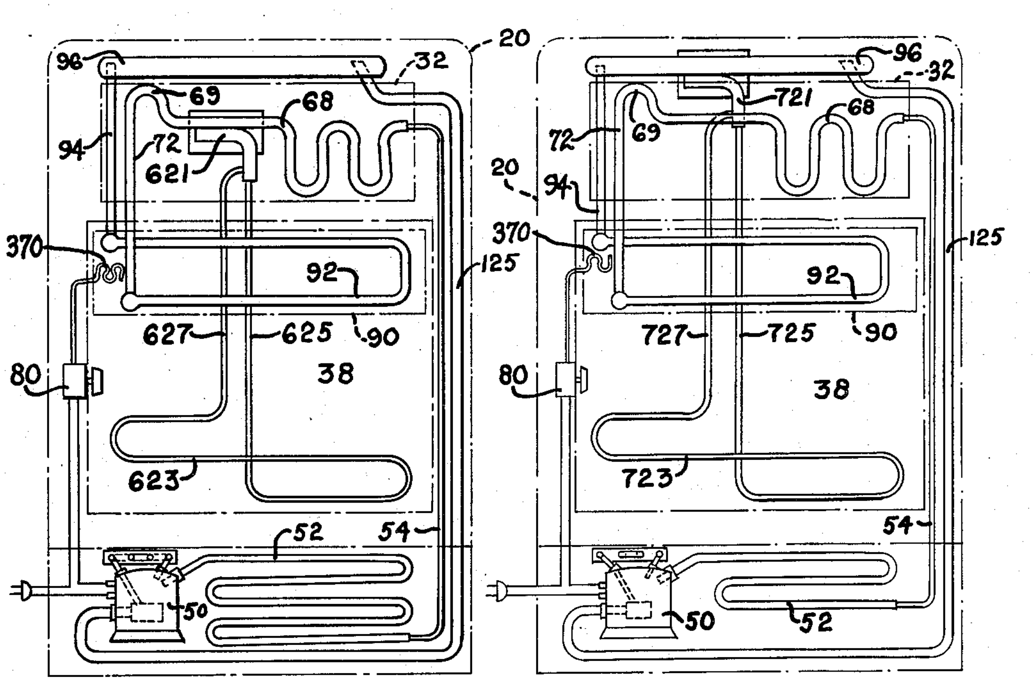
Fig. 20 is a diagrammatic view somewhat similar to Fig. 19 in which the outlet of the refrigerated plate is connected to an accumulator located at a lower level in the insulation space and connected directly to the suction inlet of the compressor.
Figure 22:
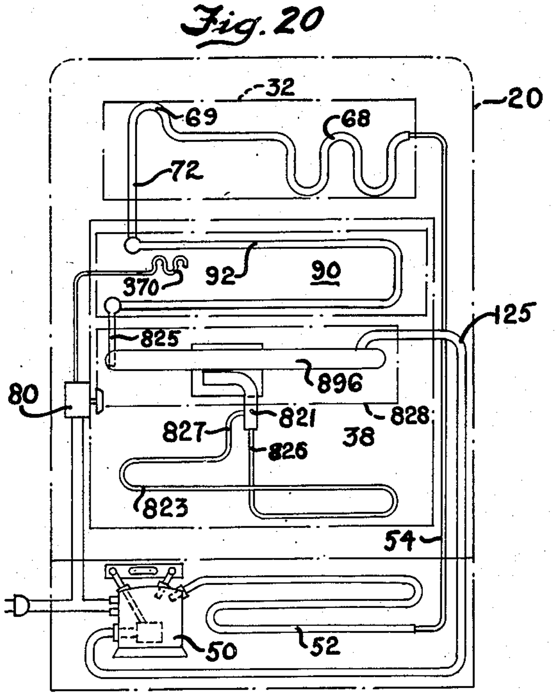

Fig. 21 is a diagrammatic view of a modified form of the invention in which the secondary condenser of the secondary refrigerating circuit is mounted in heat exchange relation with the accumulator which is located adjacent the freezing compartment in the insulation space; and Fig. 22 is a diagrammatic view in which the secondary condenser of the secondary refrigerating circuit is mounted in heat exchange relation with an evaporator portion intermediate the first and second primary evaporator stages.

Referring now to the drawings there is provided an outer hermetically sealing sheet metal shell 20 enclosing the top 22, bottom 24, sides 26 and 28, and rear 30 of the cabinet. The joints of this shell are sealed by welding or other suitable metal seal and preferably are additionally sealed on the interior by the use of some form of non-metallic sealing material such as asphalt applied in molten form.

There is provided a freezing compartment 32 in the upper portion of the cabinet in the form of a box-shaped metal container having its front side open. This freezing compartment container 32 has its front edges connected by a member 34 of a thermoplastic material called a breaker strip or throat to the front portion 36 of the outer shell 20 of the refrigerator. Beneath the freezing compartment container 32 there is provided a food compartment 38 in the form of a box-shaped metal inner container or liner having its front side open. The front edges of this box-shaped container or liner 38, forming the food compartment, are connected by a breaker strip or throat 40 of a thermoplastic or other suitable poor heat conducting material with the front wall 36 of the outer shell 20.

A separate upper door 42 containing insulation is provided for the freezing compartment 32 and has a seal 44 of a suitable synthetic rubber which extends entirely around the door 42 to make sealing engagement with the front 36 of the outer cabinet shell 20, so that when the door 42 is closed the freezing compartment 32 is substantially sealed from the outside air. The lower food compartment 38 is provided with a separate door 46 containing somewhat less insulation than the door 42. It is likewise provided with a similar synthetic rubber seal 48 extending entirely around the door which makes sealing engagement with the front 36 of the outer shell 20. This seals the food compartment 38 from the outside air. The sealing of the doors 42 and 46 against the front 36 of the outer shell 20 completes the hermetic sealing of the outside of the cabinet so that no air or moisture can enter the cabinet except by opening one of the doors.

The freezing compartment container 32 is provided with smooth surfaced inner walls so that any snow or frost accumulated therein can be scraped or brushed off. When no melting occurs such snow or frost will not adhere firmly to the freezing compartment container 32. The freezing compartment container 32 is cooled by the first stage of a primary refrigerating system which includes a sealed motor compressor unit 50 which delivers compressed refrigerant to a condenser 52, both of which are located in a machine compartment 161 beneath the bottom wall 24 of the cabinet 20. The motor compressor unit 50 is preferably of the high side type shown in the Rataiczak Patent No. 2,377,965, issued June 12, 1945. The unit contains lubricant for lubricating the motor and compressor. In such a motor compressor unit the compressed refrigerant is delivered first to the superheat removing coil 51 which cools the mixture of compressed refrigerant and oil vapor until the oil vapor is liquefied. The mixture is then delivered to the interior of the shell of the motor compressor unit. The liquefied oil remains in the interior of the shell but the compressed refrigerant in vapor form is delivered to the condenser 52.

The condenser 52 delivers liquid refrigerant through a capillary tube restrictor 54 to the inlet connection 56 of the tubular freezing evaporator, which includes a section of serpentine tubing 58 wound in serpentine fashion over the top, left side and bottom of the freezing compartment 32, after which there is a refrigerated loop 60 extending through the back wall of the compartment 32 forwardy beneath and in contact with the bottom of the ice tray shelf 62 for providing fast freezing of ice in an ice tray. The shelf 62 is beneath another ice tray shelf 64 both of which are supported upon the side wall and by a connection 66 from the top of the freezing compartment container 32. From the loop 60 the evaporator tubing extends in the form of a loop 68 upon the right side wall of the freezing compartment 32 which ends in a vertically rising portion which assists in separating the liquid refrigerant from its vapor. This connects directly to a portion 69 forming a trap for retaining liquid refrigerant in the tubular freezing evaporator. The tubular freezing evaporator and the container 32 constitute a heavy mass of high holdover capacity and is the first or initial stage or section of the series type of primary evaporating system.

The trap portion 69 is connected by a smaller conduit 72 with the bottom of a vertical refrigerated plate 90 spaced from, but fastened to, the rear wall of the food compartment container 38 within the food compartment. The refrigerated plate 90 has a minimum of mass and low holdover capacity. It is provided with a U-shaped refrigerant passage 92 constituting the second stage or section of the series type primary evaporator circuit. The passage 92 extends across the bottom, up one edge, and back across the top of the plate 90. From the upper end portion of the refrigerant passage 92 in the plate 90 there extends a refrigerant conduit 94 extending into the top of a disengaging tank or accumulator 96, extending substantially across the upper rear edge of the freezing compartment container 32 on the outside thereof. This tank or accumulator 96 is adapted to trap liquid refrigerant and for such refrigerant acts as the third stage of the evaporating system. It is fastened by the brackets 98 to the adjacent surface of the container 32 so that it is in heat transfer relation therewith. The top of this tank or accumulator 96 is connected by the refrigerant conduit 121 with a coupling 123 which connects with the suction conduit 125 connecting directly with the inlet of the compressor in the motor compressor unit 50.

The bottom of the food compartment 38 is provided with two covered pans 127 and 129 to keep food at a high humidity. The covers of these pans are conveniently arranged with a slidable support for the pans so that the pans can be pulled out as drawers. Since these pans 127 and 129 are substantially closed by their covers, it is desirable to provide additional cooling so that the food within these pans is kept at a suitable refrigerating temperature. For this purpose there is wrapped about the sides and back of the liner 38, in serpentine fashion, the tubing 131 which constitutes the evaporator of a secondary refrigerant circuit which includes the connecting conduits 133 and 135 which are connected to the serpentine secondary condenser 137 clamped by the clamping members 138 and 139 to the outer surface of the rear wall of the liner 38 directly behind the refrigerated plate 90. The refrigerated plate 90 is fastened to the rear wall of the liner 38 by spacers and bolts 91 which provide a path for metal to metal conduction so that ample cooling is provided for the secondary condenser 137. By this arrangement, the secondary condenser condenses refrigerant at a sufficient rate to evaporate refrigerant in the tubing 131 fast enough that the bottom portions of the liner 38 are kept at a temperature between about 34° and 36° F.

Figure 1:
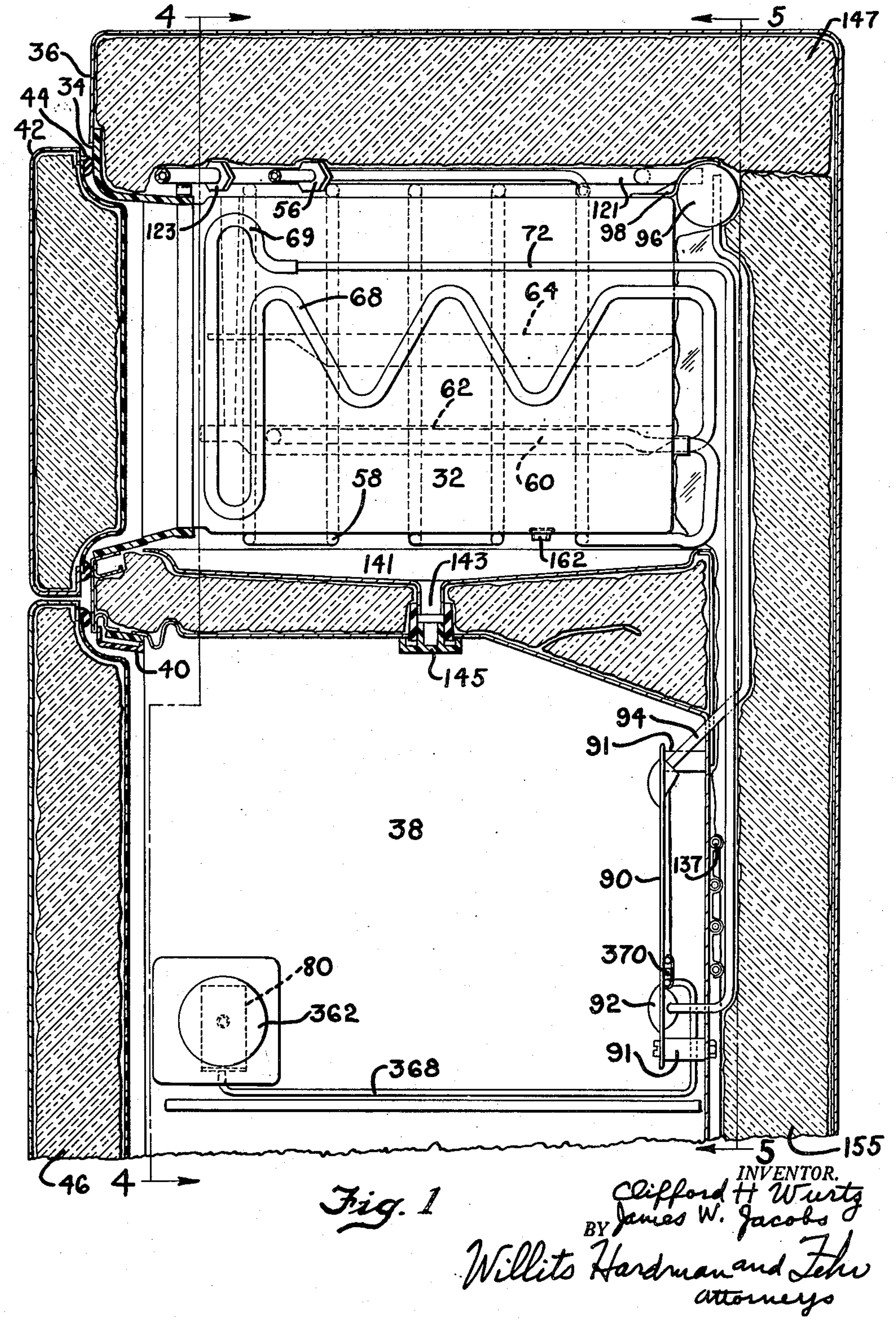
Fig. 1 is a vertical sectional view taken substantially along the line 1—1 of Figs. 4 and 5 of the upper portion of a two temperature refrigerator embodying one form of our invention.
Figure 2:
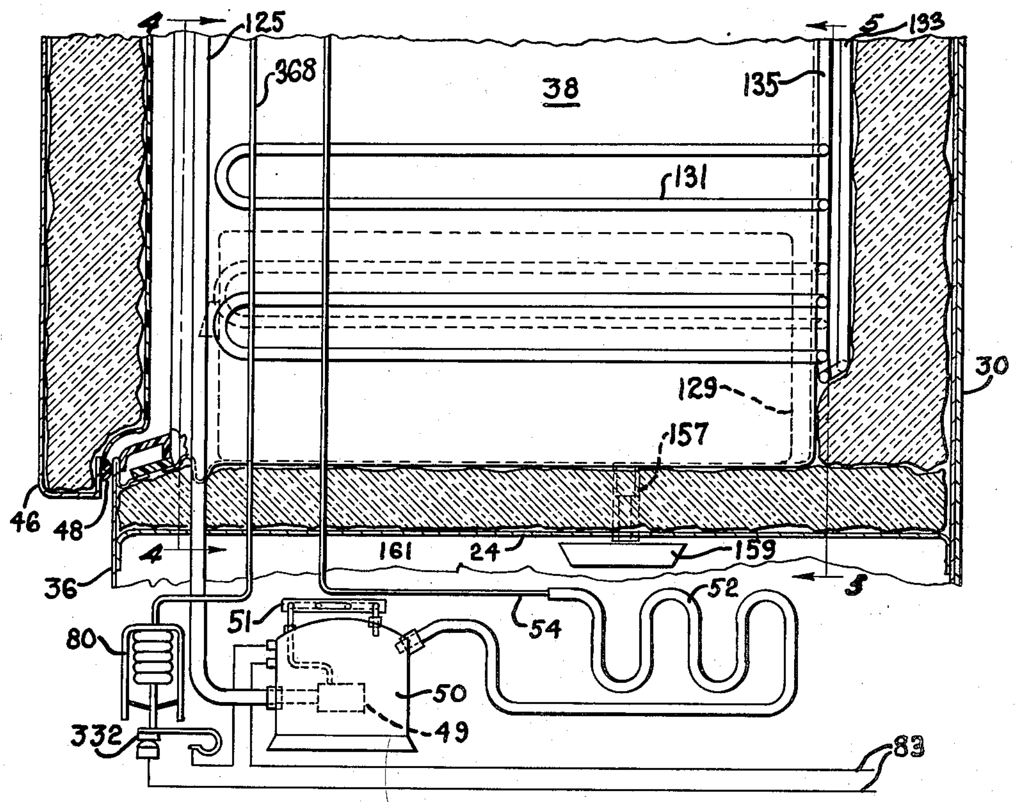
Fig. 2 is a vertical sectional view taken substantially along the line 2—2 of Figs. 4 and 5 of the bottom portion of the two temperature refrigerator, the upper portion of which is shown in Fig. 1.
Figure 3:
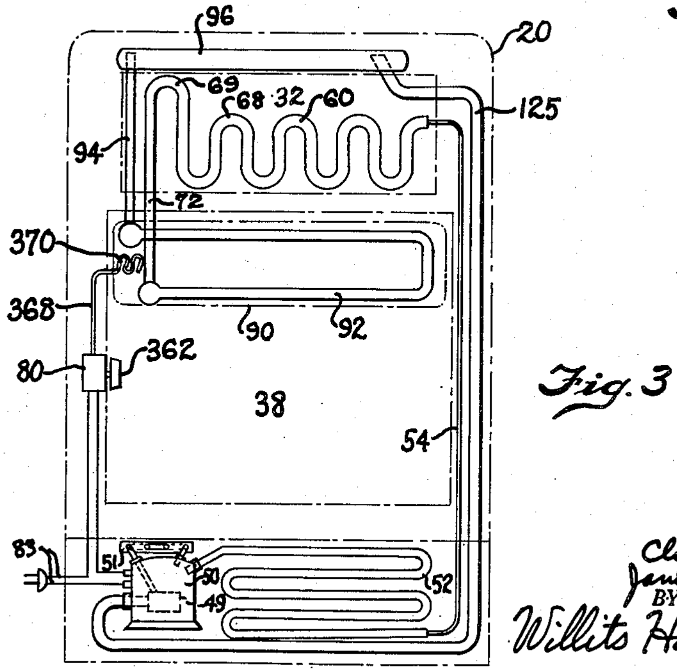
Fig. 3 is a diagrammatic view of the refrigerating system and its controls shown in full line with the outlines of the refrigerator cabinet shown in dot-dash lines.
Figure 6:
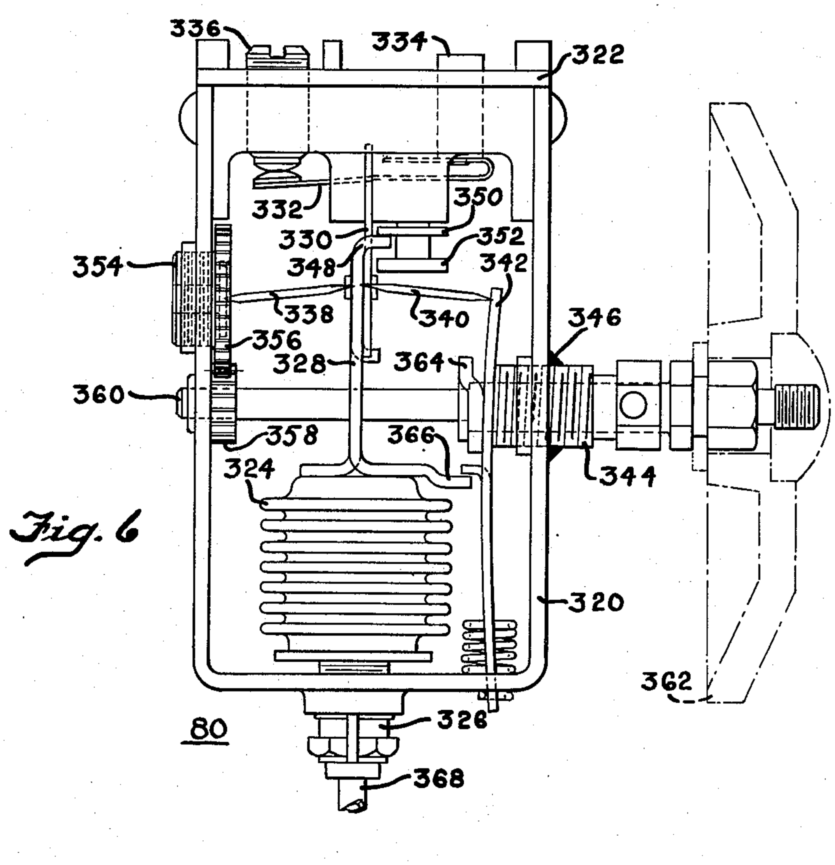
Fig. 6 is a view of the constant cut on type switch shown diagrammatically in Figs. 2, 4 and 5.

The operation of the refrigerating system is controlled by a thermostatic control switch 80 mounted on the inner side of the food compartment liner 38 as shown in Fig. 1. This switch 80 is shown in detail in Figs. 6 and 7 and includes a U-shaped metal frame 320 having a switch block 322 of a suitable electric insulating material mounted between the open ends thereof. Within the U-shaped frame 320 there is provided a metal bellows 324 adjustably mounted by the adjustable mounting screw 326 threaded through the yoke of the frame 320. The bellows 324 is connected by a metal follower 328 and a link 330 of an electrical insulating material with the leaf spring contact member 332. One end of this leaf spring contact member 332 is anchored to an electric terminal 334 extending through the block 322. The other end of the leaf spring 332 is provided with an electrical contact which is adapted to make and break contact with the adjustable terminal 336 provided with an electric contact on its inner end. The bellows 324 is therefore directly connected with the leaf spring member 332.

To insure snap action operation of the spring contact member 332, the bellows follower 328 has pivotally connected to it, the inner ends of the pair of triangular-shaped toggle links 338 and 340. The outer end of the link 340 is pivotally connected to the cantilever end portion of a bar-type spring 342. The lower end of the bar-type spring is loosely anchored in an aperture in the yoke of the frame 320 as is clearly shown in Fig. 6. At an intermediate portion, the bar-type spring 342 is engaged by a screw 344 which is threaded through the side of the frame 320. After this screw 344 is properly adjusted to apply the proper normal column loading to the toggle links 338 and 340 to insure the snap action desired, it is locked in place by some form of sealing material designated by the reference characters 346.

Figure 7:
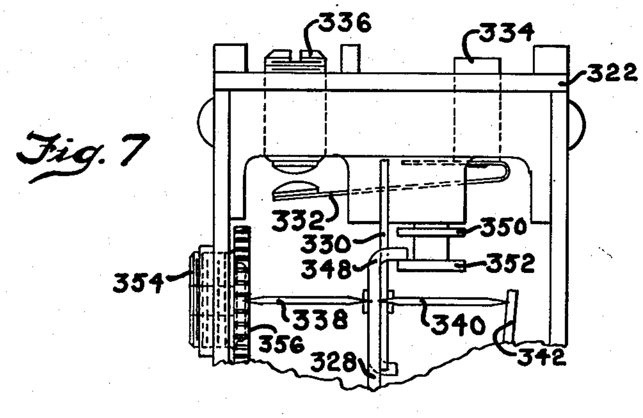
Fig. 7 is a fragmentary view of the switch shown in Fig. 6 showing the switch in the open circuit position.

The bellows follower 328 is provided with a projection 348 which operates between the upper projection 350 and the lower projection 352 upon an adjusting screw, threaded through the block 322. This screw is adjusted so that the lower projection 352 stops the opening movement of the leaf spring contact member 332 at the point where the toggle links 338 and 340 are exactly in alignment as shown in Fig. 7. This adjustment insures that the switch will always have a constant closing temperature after the adjusting screw 326 is properly set. According to this invention, the screw 326 may be adjusted so that the closing temperature of the switch is from 34° to 36° F. We prefer to set the switch to close at 36° F.

Figure 4:
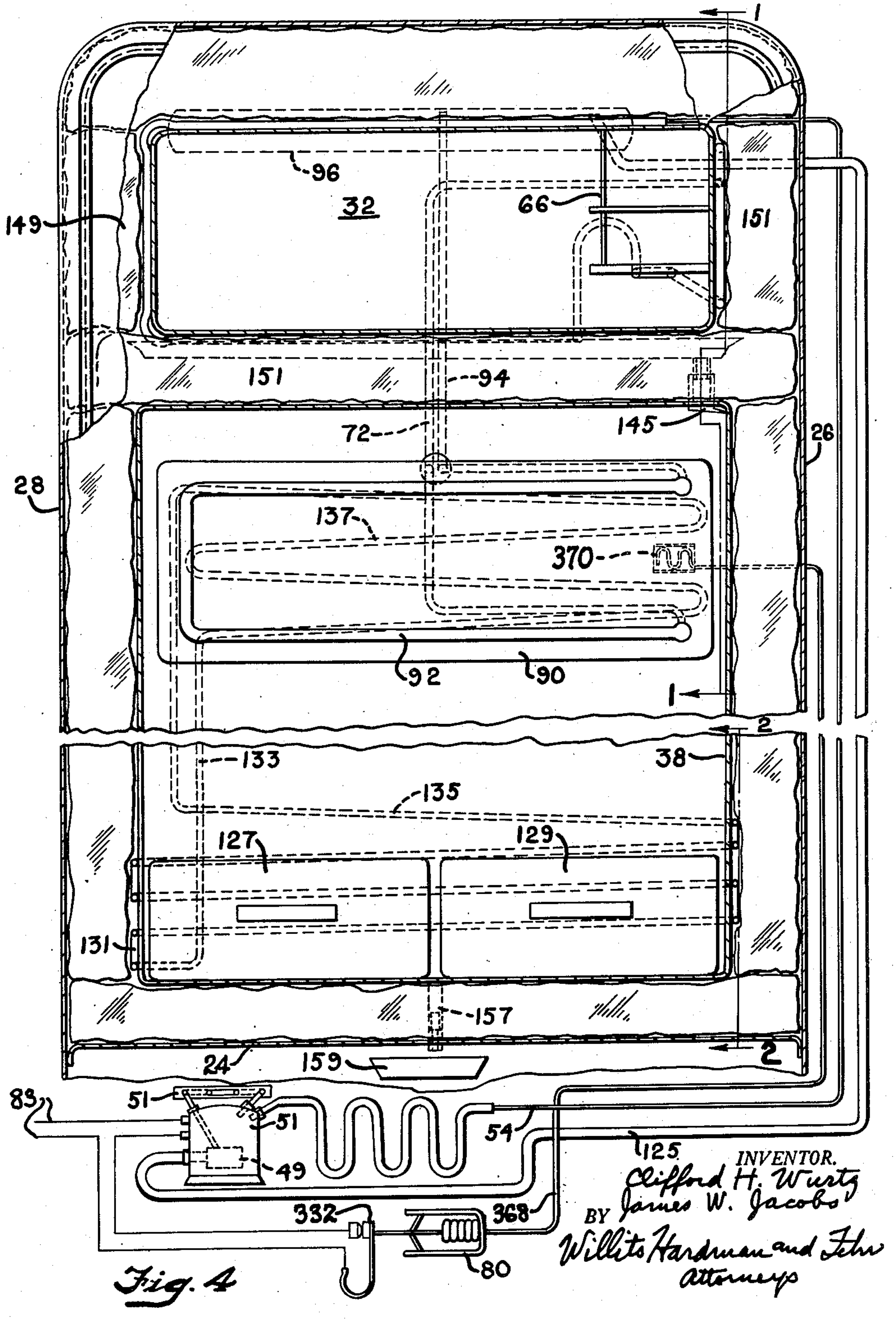
Fig. 4 is a fragmentary front vertical sectional view taken substantially along the lines 4—4 of Figs. 1 and 2.
Figure 5:
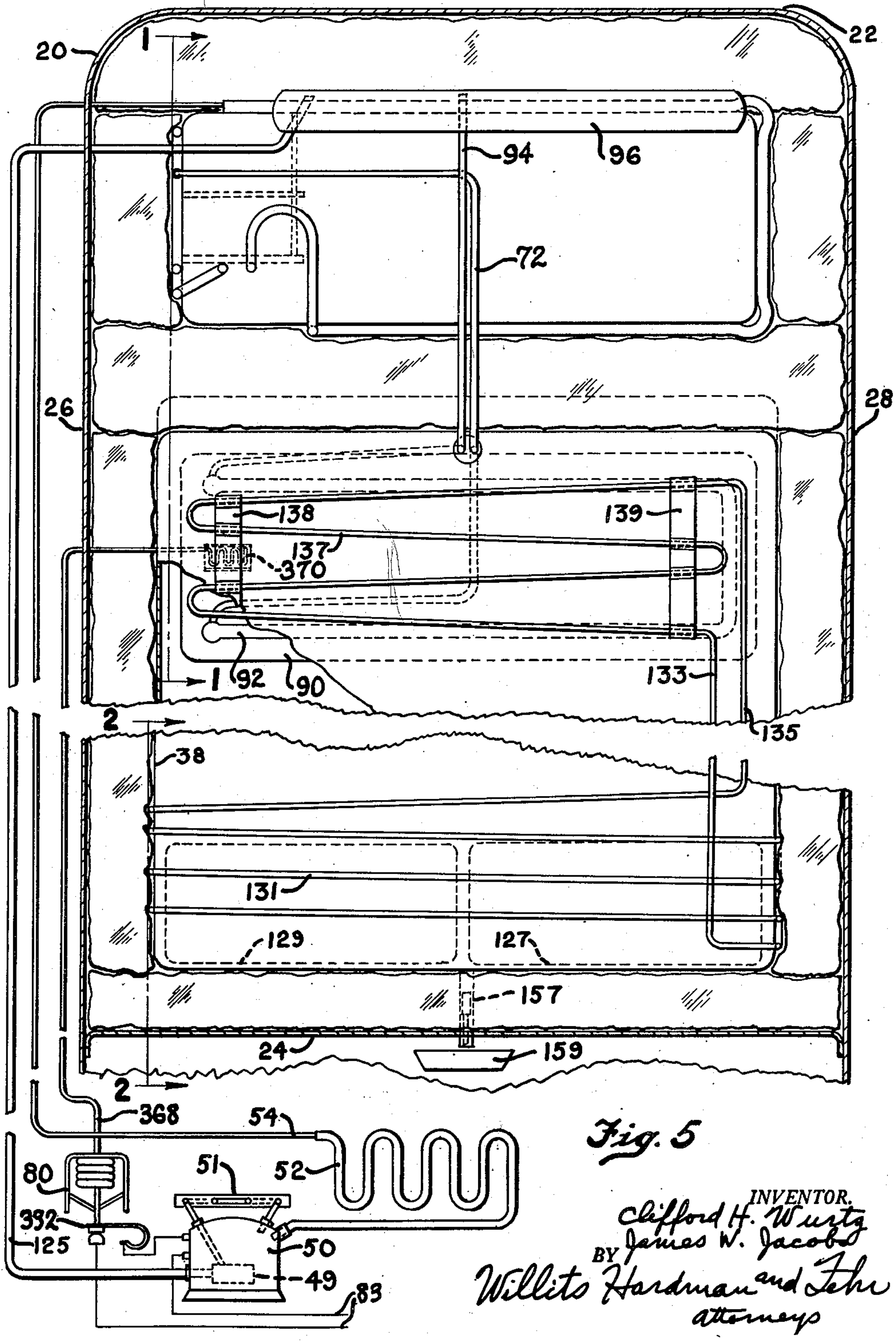
Fig. 5 is a fragmentary rear vertical sectional view taken substantially along the line 5—5 of Figs. 1 and 2 with the back insulation removed.

The switch, however, is provided with a manually adjustable switch opening control. This may take any desirable form but as one example, we have shown a screw 354 provided with a very fine thread which is threaded through an aperture in the side wall of the frame 320. This screw is provided with a bearing which carries a bearing support for the outer end of the toggle link 338. The screw 354 is provided with gear teeth 356 which are in engagement with a pinion 358 fixed to the pinion shaft 360. The opposite end of this pinion shaft 360 extends through the hollow interior of the screw 344 which serves as a bearing and has a knob 362 fastened to the opposite end. This knob 362 may be turned to rotate the screw 354 so as to vary the column loading upon the toggle links 338 and 340. This arrangement may be adjusted to provide a cut off point which varies between about plus 5° to minus 10° F. The shaft 360 is also provided with a cam 364 adapted to engage a projection 366 upon the bellows follower 328 for the purpose of forcibly holding the leaf spring member 332 in the open circuit position. The bellows 324 is connected to a capillary tube 368, the end 370 of which is formed into a serpentine shape and clamped to the back of the refrigerated plate 90 as shown in Figs. 1, 4 and 5.

This arrangement insures that the refrigerated plate will be cooled to a low temperature of about plus 5° F. to minus 10° F. during every running cycle but after reaching this point, the operation of the system will be stopped and the refrigerated plate 90 will rapidly warm up to a temperature above 32° F., such as 36° F. so that it will completely defrost during every idle period. However, because of the relatively high mass of the freezing compartment container and its first stage evaporating means, the packages within the freezing compartment container and the container itself will remain at low freezing temperatures such as 12° F. or below, despite the defrosting of the second stage evaporator 90 during the idle period. The operation of the plate 90 under such a wide cycle keeps the humidity in the compartment 38 well below the saturation point so that food that is placed within the compartment 38 will not become wet. However, foods which are subject to dehydration should be kept in the pans 127 and 129. Foods in closed containers which are not subject to dehydration are placed in the remainder of the food compartment 38.

While it is possible to seal the outer cabinet shell 20 from the air in the room, because of construction problems, it is not possible to seal the insulation space from the interior of the freezing compartment container 32 and the food compartment liner 38. It is well known that moisture vapor tends to migrate to the coldest point to which it has access. To prevent this moisture vapor from migrating to the freezing compartment container 32 the freezing compartment container 32 is sealed from the food compartment liner 38 by having a separate door 42 with its own seal 44. The moisture vapor is prevented from migrating to the outer surface of freezing compartment container 32 by being surrounded with insulation in the form of glass or mineral wool enclosed in hermetically sealed bags of a suitable plastic material such as polyethylene or polyvinylidene chloride.

For example, there is provided a bag 147 in the space above the freezing compartment container 32 and the bags 149 and 151 in the insulation spaces at the side of the container 32 and a bag 151 between a catch pan 141 and the top of the food compartment liner 38. There is also provided a bag 155 which fills the insulation space at the rear wall of the cabinet. All these bags closely envelop the freezing compartment container 32 and the evaporator tubing surrounding it. The material forming the bags is very flexible and resilient and the glass or mineral wool used inside these bags is likewise very flexible and resilient so that the bags hug and surround the container 32 and the first stage primary evaporator very closely so that access by moisture vapor to these surfaces through the insulation space is almost completely blocked so that substantially no moisture is deposited thereon.

The moisture vapor therefore within the outer shell 20 migrates to the next coldest spot to which it has access. The next coldest spot is the refrigerated plate 90 which may be cooled to as low as minus 10° F. during the running cycle. This causes any moisture vapor within the insulation spaces to tend to migrate to the refrigerated plate 90 and to be deposited as frost thereon. This keeps the insulation dry. Since this evaporator plate 90 is colder than the evaporator 131 on the outer surface of the liner 38, the evaporator 131 will be prevented from condensing moisture in the insulation space.

Because the switch 80 is set to prevent the starting of the refrigerating system until the refrigerating plate 90 reaches the temperature of from 34° to 36° F., the refrigerating plate 90 will defrost during each idle period of the motor compressor unit. The defrost water will fall to the bottom of the liner 38 and will be conducted by the drain 157 to a pan 159 in the machine compartment.

Occasionally it may be desired to completely defrost the interior of the freezing compartment container or it may be desired to shut down the refrigerating system for moving it to another location, or some other reason. For this purpose there is provided an outlet 162 in the bottom of the freezing compartment container 32 for draining the defrost water therefrom into the catch pan 141. Should there be any frost on the outside of the container 32 and the first stage primary evaporator, the defrost water therefrom will likewise be collected by the catch pan 141 since the catch pan 141 protrudes beyond the periphery of the freezing container 32. The catch pan 141 slopes to the right side of the cabinet and is provided with a drain outlet 143 which extends through an aperture into the top wall of the food compartment liner 38. Upon the bottom side of the top wall of the liner 38 the drain outlet 143 is provided with a spout 145 for discharging the defrost water on to the right vertical side wall of the food compartment liner 38. This water flows down the side wall to the bottom of the liner and is deposited in the pan 159 in the same way as the defrost water from the plate 90.

Figure 10:
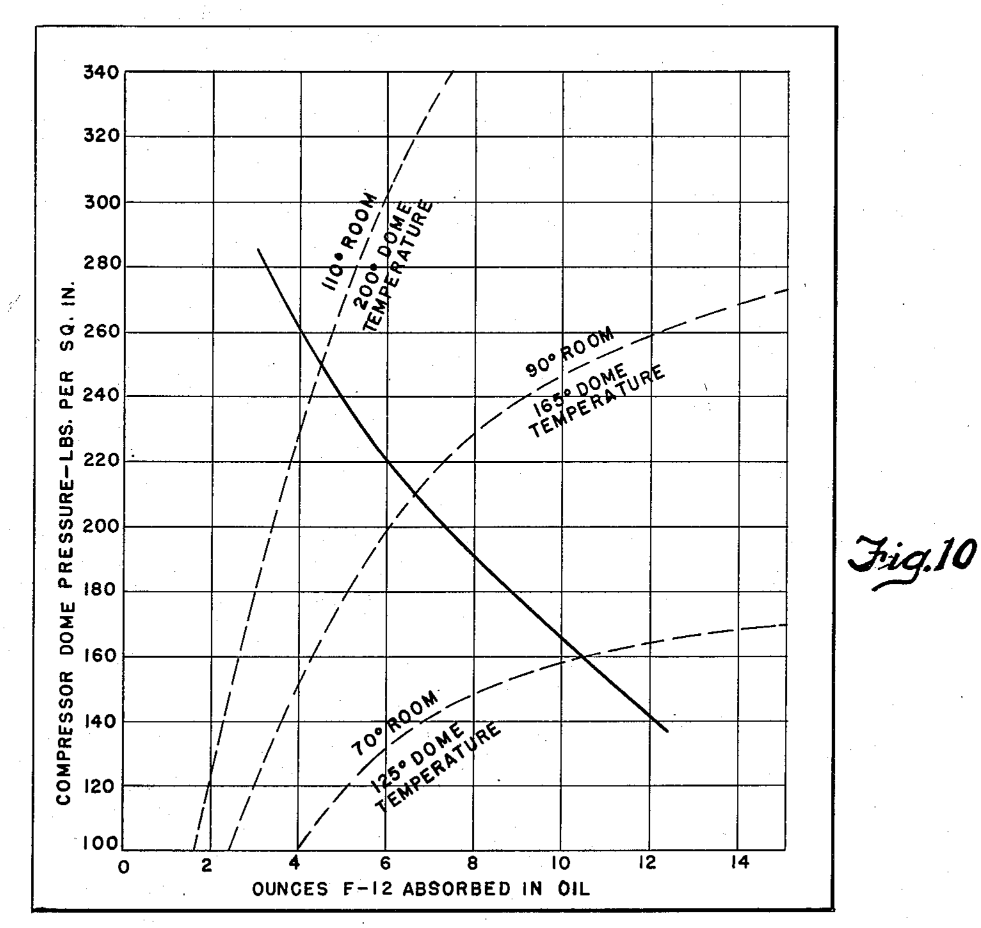
Fig. 10 is a chart showing the ounces of refrigerant absorbed in the compressor lubricating oil under running conditions at various room temperatures and compressor dome pressures.

If the refrigerating system were charged with a normal full amount of refrigerant there would be a tendency to overly cool the unfrozen food compartment 38 in a relatively cold room such as 70° F. This is prevented by having a lesser amount of refrigerant in the primary refrigerating system than is customary. According to our invention, we use a refrigerant such as difluorodichloromethane which is absorbed in and evolved from the lubricant in the system as shown in Fig. 10. Many other refrigerants have this property. The total refrigerant charge provided in the system is approximately equal in volume to the amount of refrigerant required to completely fill the first stage primary evaporator, that is the tubular freezing evaporator mounted upon the freezing container 32, plus the amount of refrigerant absorbed by the lubricating oil in the motor compressor unit during running conditions in a 70° room. By using a refrigerant which is readily absorbed in the lubricant used and by providing sufficient lubricant in the system on the high side in the motor chamber of the sealed unit 50, there is provided an inherent adjusting factor because at warmer room temperatures there is less refrigerant absorbed in the lubricant providing greater amounts of refrigerant for supply to the refrigerated plate 90 during running conditions so that an additional amount of refrigeration is provided for the food compartment at the warmer room temperatures to compensate for an increase in heat leak into the food compartment. This provides a system in which the average temperatures in the food compartment 38, which are relatively critical, may be maintained at very nearly the same temperature regardless of changes in the room temperature in which the refrigerator is located. At the same time, the frozen food compartment 38 is kept at safe refrigeration temperatures. It is permissible for the temperatures in the frozen food compartment 32 to vary more than the temperatures in the unfrozen food compartment 38.

The providing of the accumulator 96 following the refrigerated plate 90 in the primary refrigerant circuit aids in providing just the proper amount of refrigerant for the different compartments to maintain the desired temperatures under varying room temperature conditions. To a limited extent it acts as a third stage evaporator and under very warm room temperature conditions can receive unevaporated liquid refrigerant from the refrigerated plate during running conditions. This accumulator prevents such refrigerant from entering the suction conduit 125. Immediately after the termination of the running period, the evaporation of the refrigerant within the plate 90 will cause the vapor pressure therein to rise. During the running period the first stage of the primary evaporating system which is in contact with the outside of the freezing compartment container 32 conducts considerable amounts of refrigerant vapor in addition to the liquid refrigerant. The proportion of vapor to liquid increases as the refrigerant progresses through the tubing.

Figure 11:
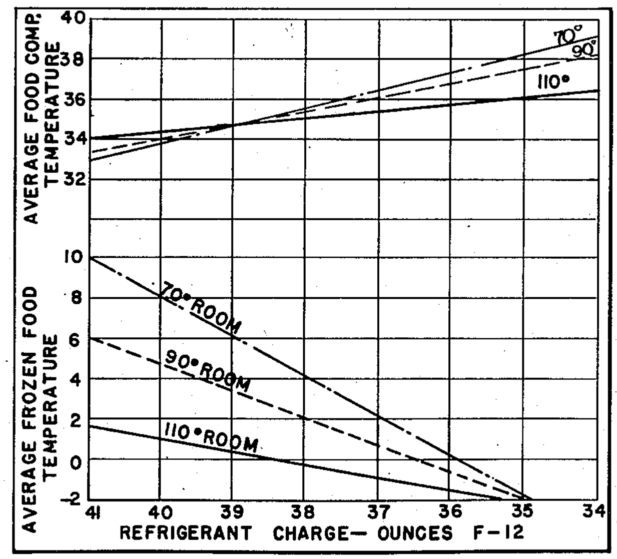
Fig. 11 is a chart showing the effect of different amounts of refrigerant in the system upon the average food compartment temperatures and the average frozen food temperature in 70°, 90° and 110° F. room temperatures.

Consequently, when the motor compressor unit 50 is stopped by the refrigerated plate 90 reaching the predetermined low temperature to which the control switch 80 is set, there is a considerable vapor space in the latter portion of the first stage evaporator. Since the food compartment 38 is much warmer than the freezing compartment 32 the vapor pressure will be much higher within the refrigerated plate 90 which constitutes the second stage primary evaporator. The vapor pressure within the plate 90 will rise much more rapidly because of its relatively small mass and large surface area which it has exposed to the atmosphere in the food compartment 38 which is at a temperature of about 35° F. as illustrated in Fig. 11. The first stage freezing compartment evaporator which surrounds the container 32 is a part of a relatively heavy mass held at a relatively low temperature as illustrated in Fig. 11 so that the vapor temperature rise will be very slow as compared to the vapor pressure rise in the refrigerant plate 90. This will cause the liquid in the refrigerated plate 90 and the end of the running cycle to be forced in the reverse direction upwardly through the pipe 72 and over the trap portion 69, back into the loop portion 68 of the first stage evaporator until the plate 90 is substantially completely stripped of liquid refrigerant. Any liquid refrigerant in the refrigerated plate 90 which happens to escape this liquid returning action will be quickly evaporated and condensed in the accumulator tank 96 which because of its location and connection is kept at temperatures near the temperature of the freezing compartment container 32.

This novel system provides for the rapid defrosting of the refrigerated plate 90, thereby shortening the idle period of the refrigerating system under all room temperatures. It keeps the average box temperature under all conditions relatively low in all room temperatures and yet insures complete defrosting of the refrigerated plate 90 during every idle period of the motor compressor unit 50. By keeping the idle period relatively short under all room temperatures, the freezing compartment 32 is maintained at safe refrigerating temperatures for frozen foods under varying room temperature conditions.

To adjust the system to provide the proper relationship of temperatures maintained in the freezing compartment and in the food compartment, the system is placed in a 110° room and after reaching uniform operating conditions, the opening or cut off point of the thermostatic switch 80 is adjusted by adjusting the adjusting screw 326 until the desired temperature is attained in the freezing compartment 32. In general, this point may be adjusted between minus 15° and plus 5° F. to obtain a package temperature below 10° F. The refrigerator is then placed in a 70° room and operated until it reaches a substantially uniform condition. The refrigerated plate 90 should not receive substantial amounts of liquid refrigerant during the initial portion of the running cycle. If substantial amounts of liquid refrigerant is received during the initial portion of the running period or if the compartment 38 is too cold, there is too much refrigerant in the system and refrigerant should be removed from the refrigerant circuit until desired food compartment temperatures are obtained. By this arrangement desirable refrigerating temperatures in both the freezing compartment 32 and the food compartment 38 are maintained under all room temperatures varying between 70° and 110° F.

Figure 8:
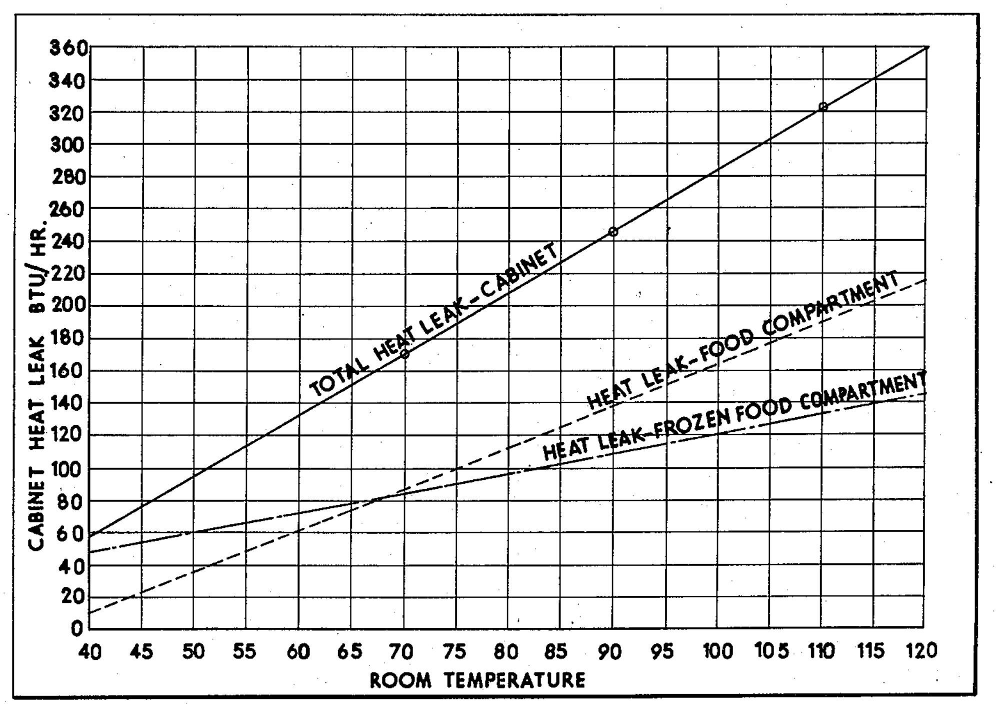
Fig. 8 is a chart showing the total heat leak of the refrigerator cabinet and the heat leak for the separate compartments for various room temperatures.
Figure 9:
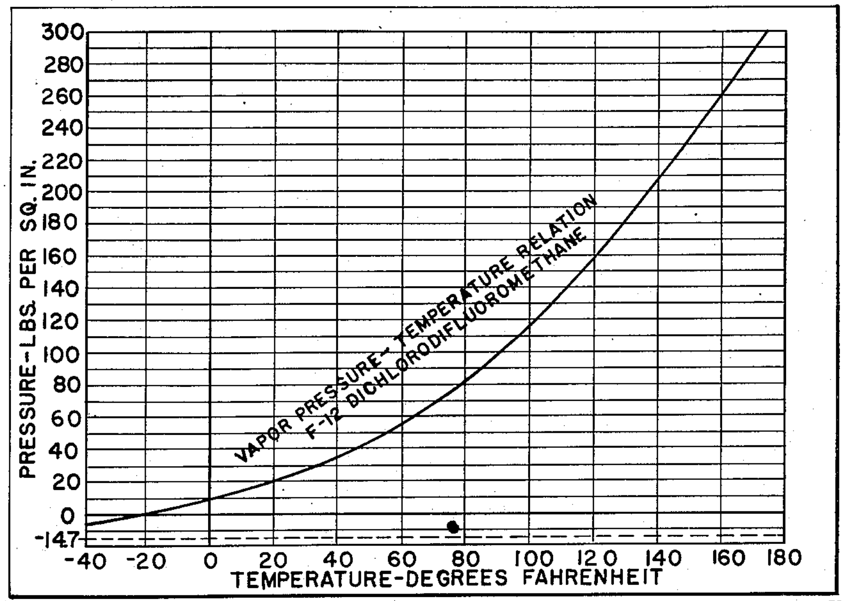
Fig. 9 is a vapor pressure-temperature chart of the refrigerant used in the system.

As one specific example of this invention, the refrigerator may be arranged to provide the freezing compartment 32 with 2 cu. ft. of interior space and the food compartment 38 with 8 cu. ft. of space. The liner 38 has a surface area of about 3690 sq. in. The total surface area of the refrigerated plate 90 is about 408 square inches so that the refrigerated plate 90 has a surface area of about 1/9 of the total surface area of the food compartment liner 38. The cabinet has a heat leak rate shown by the chart of Fig. 8. A 7/32 hp. sealed motor compressor unit is provided. The compressor has a displacement of 0.75 cu. in. per revolution and operates at a speed varying from 1750 R. P. M. to 1700 R. P. M. as the suction pressure varies from 0 lbs. gauge to 21 lbs. per square inch gauge. The compressor has a nominal capacity of 565 B. t. u. per hour at 0 lbs. gauge and 1179 B. t. u. per hour at 21 lbs. gauge.

The suction line connected directly to the compressor intake and the compressor 49 then discharges into the super-heat removing coil 51 where the lubricant is condensed out of the refrigerant vapor and the mixture is returned to the interior of the shell of the sealed motor compressor unit 50 where the lubricant is collected while the refrigerant vapor is conducted to the condenser 52. The system is charged with 15 ounces of 525 viscosity mineral oil lubricant.

The condenser 52 has a capacity ample to condense the refrigerant vapor to liquid more rapidly than the liquid refrigerant flows out of the condenser 52 through the restrictor 54. The restrictor 54 has a length of about 120 inches and an interior diameter of 0.031 inch. The first stage of evaporator tubing, which is in direct thermal contact with the freezing compartment container 32, is about 34 feet long and has a volume of about 34 cu. in. The refrigerant passage 92 in the refrigerant plate 90 has a length of about 49 inches and a volume of about 2 cu. in. The system is charged with approximately 39 ounces of difluorodichloromethane (F-12) having a volume in liquid form of about 49 cu. in. If desired, about 2 c. c. of methol alcohol having a volume of only 0.12 cu. in. may be added to the refrigerant in the system to prevent freezing in the restrictor 54 if the system is not completely dry. The accumulator 96 is about 20 inches long and has an outer diameter of about 1½ inches and a total volume of about 32½ cu. in. As illustrated by the chart, Fig. 10, there is about 10½ ounces absorbed in the oil under running conditions in a 70° room. This corresponds to a liquid volume of about 13 cu. in.

The liquid volume of the free refrigerant in the system in a 70° room therefore is 49 minus 13 or 36 cu. in. This is substantially equal to the total volume of first stage freezing evaporator which has a volume of about 34 cu. in. The effect of varying the charge of refrigerant in the system is shown in the chart of Fig. 11 for 70°, 90° and 110° room temperatures. With a refrigerant charge of 39 ounces, the average food compartment temperature is about 35° F. with a total average variation of less than 1° F. in various room temperatures. To our knowledge, no previous refrigerator of this or any similar multitemperature type can approach such a performance. The frozen food compartment temperature varies from about 0° to 6° F. which is quite satisfactory. As shown by the chart, further reduction in the refrigerant charge lowers the average frozen food temperature and causes a slight widening of the temperature limits in the unfrozen food compartment 38. Reducing the refrigerant charge also increases the percentage of running time and slightly increases the amount of current consumed. While the exact figures given in the foregoing example need not be strictly adhered to but the various proportions are material and reasonable adherence to the proportions indicated are necessary to achieve the splendid performance reported above.

Figure 12:
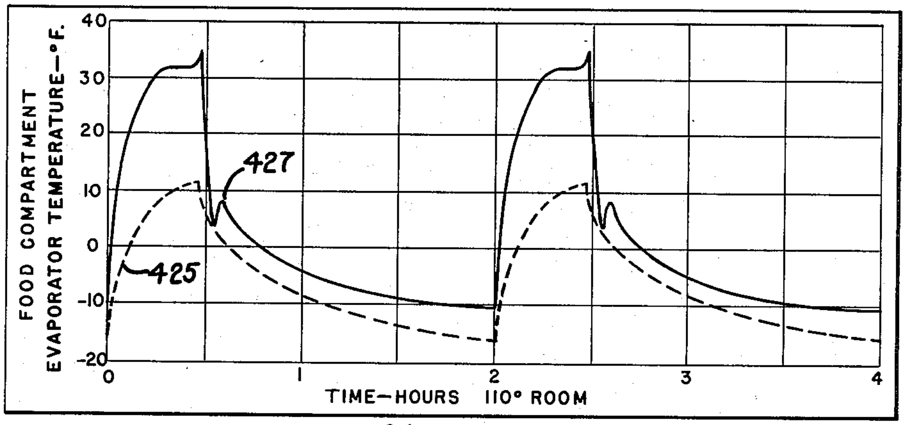
Fig. 12 is a chart showing typical cycling of the food compartment evaporator temperature in a 110° room.
Figure 13:
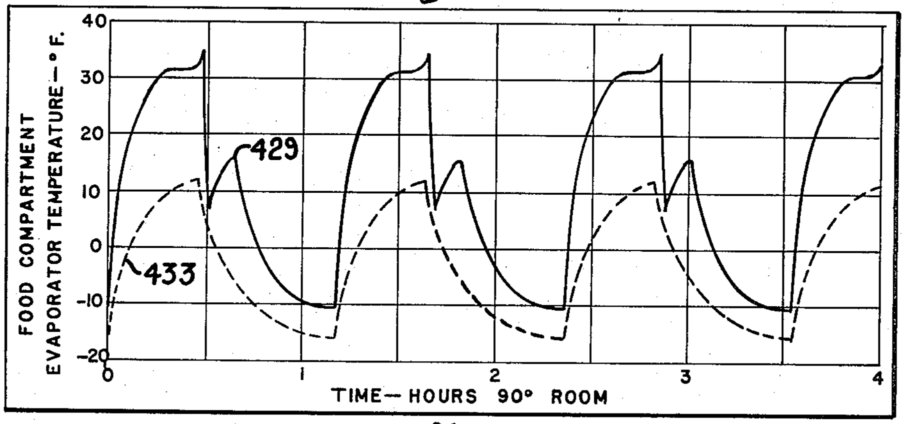
Fig. 13 is a chart showing the typical cycling of the food compartment evaporator temperature in a 90° room.
Figure 14:
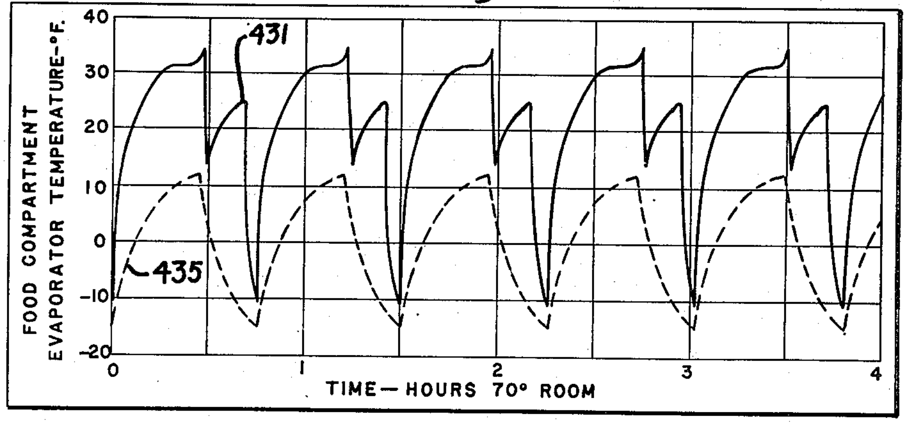
Fig. 14 is a chart showing the typical cycling of the food compartment evaporator temperature in a 70° room.

The manner in which the substantially uniform unfrozen food compartment temperature is achieved is illustrated in the charts, Figs. 12 to 14. In Fig. 12 in a 110° room the off period time is shown to be about a half an hour. During this period, the temperatures of the refrigerator plate 90, which is shown in full lines in the chart, rises rapidly from minus 10° F. to a temperature of 32° F. It remains at this temperature during the time the frost melts therefrom and as soon as the frost is melted, rises rapidly to the cut on or switch closing temperature of the switch illustrated as being 34° F.

During this idle period, because there is no liquid refrigerant within the refrigerated plate 90, the vapor pressure in the refrigerating system does not correspond to the temperature of the refrigerated plate. To illustrate this, there is shown a dotted line 425 which indicates the temperature corresponding to the refrigerant pressure prevailing in the system during the idle and operating periods. It will be seen that this rises to only a pressure corresponding to about 11°

F. so that this low refrigerant vapor pressure in the system permits the liquid refrigerant in the system wherever it is located to evaporate at low refrigerating temperatures. This keeps the freezing evaporator actively refrigerating during most of the idle portion of the refrigerating cycle.

As soon as the switch 80 closes, a slight amount of liquid refrigerant is delivered from the freezing evaporator to the plate 90 and the temperature of the refrigerated plate 90 drops rapidly. Within a very short time, it becomes starved of liquid refrigerant since all of the liquid refrigerant supplied to the freezing evaporator is being evaporated there to cool the container 32 and a brief rise in temperature of the plate 90 is noted providing a projection 421 in the temperature curve. After a short time, the freezing evaporator has been cooled enough that all the liquid refrigerant is not evaporated there and liquid refrigerant again begins to flow to the refrigerated plate 90 and its reduction in temperature continues for nearly an hour and a half until a temperature of about minus 10° F. is reached at the end of the running period. Thus, it will be seen that the average temperature of the refrigerated plate 90 in a 110° room is quite low and this makes it possible to keep the unfrozen food compartment temperature as low as 35° in a 110° room.

As shown in Fig. 13, the projection 429 is much higher than the projection 427 in Fig. 12. This projection 429 illustrates the rises in temperature due to the starving or lack of liquid refrigerant supply to the refrigerated plate 90 at the initial portion of the running period in a 90° room. It will be seen that this starving continues for nearly 10 minutes in a 90° room whereas in a 110° room the starving continues for less than 5 minutes. In a 70° room as shown in Fig. 14, the projection 431 corresponds to the projection 429 and 427. It should be noted that here the starvation begins sooner and at a higher temperature than in either the 90° or 110° room. It also lasts for a slightly longer period of time and rises to a higher temperature.

The idle period in a 70° room is approximately the same length as in the 90° and 110° rooms but the operating period is much shorter since the switch opening temperature of minus 10° F. of the refrigerated plate 90 is reached in a very short time, such as less than 5 minutes after the liquid refrigerant begins to flow into the plate 90. Therefore, in the 70° room the refrigerated plate 90 is cooled primarily by refrigerant vapor it receives from the freezing evaporator thus providing more efficient operation of the system at 70°. Since a refrigerator operates in approximately a 70° room during all parts of the year in most localities except in the summer months, this high efficiency in this temperature is of great value. It should also be observed that the temperature curves 433 and 435 in the form of dotted lines in Figs. 13 and 14 have substantially the same high and low temperature points as the curve 425 in Fig. 12. This illustrates one reason, in addition to the great mass, why the freezing compartment container 32 maintains a satisfactory low freezing temperature under varying room temperature conditions from 70° to 110° F.

Figure 15:
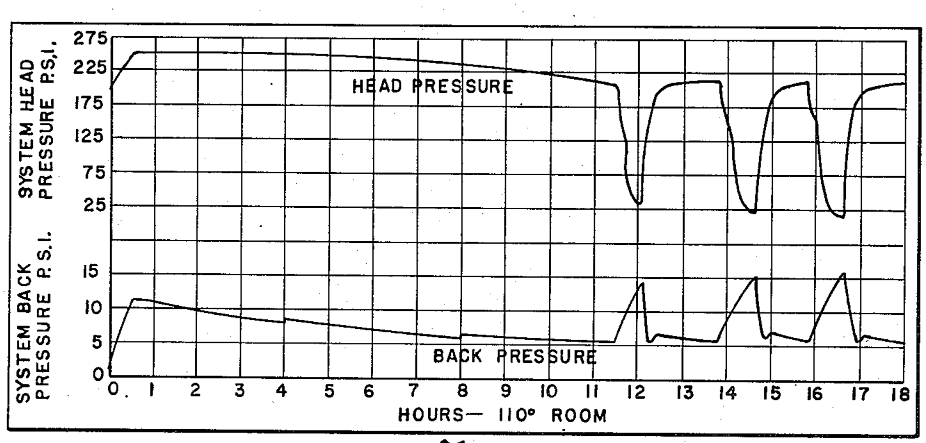
Fig. 15 is a chart showing the typical cycling of the head pressure and back pressure under initial starting and subsequent normal running conditions in a 110° room.
Figure 16:
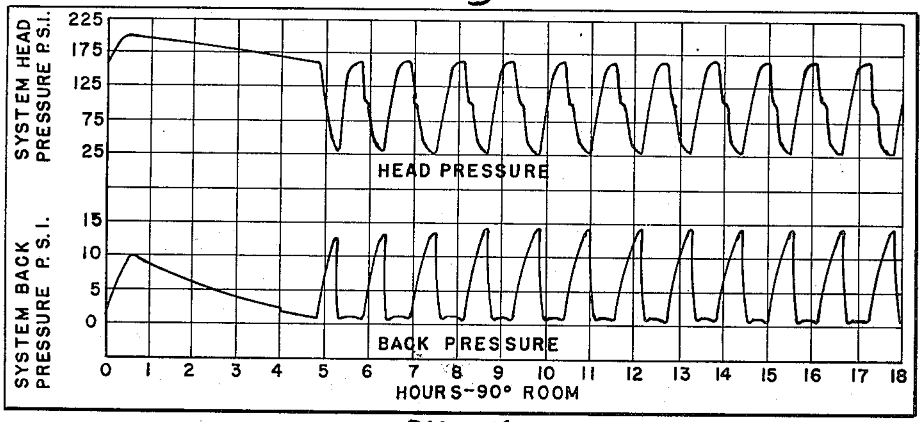
Fig. 16 is a chart showing the typical cycling of the head and back pressure under initial starting and subsequent normal running conditions in a 90° room.
Figure 17:
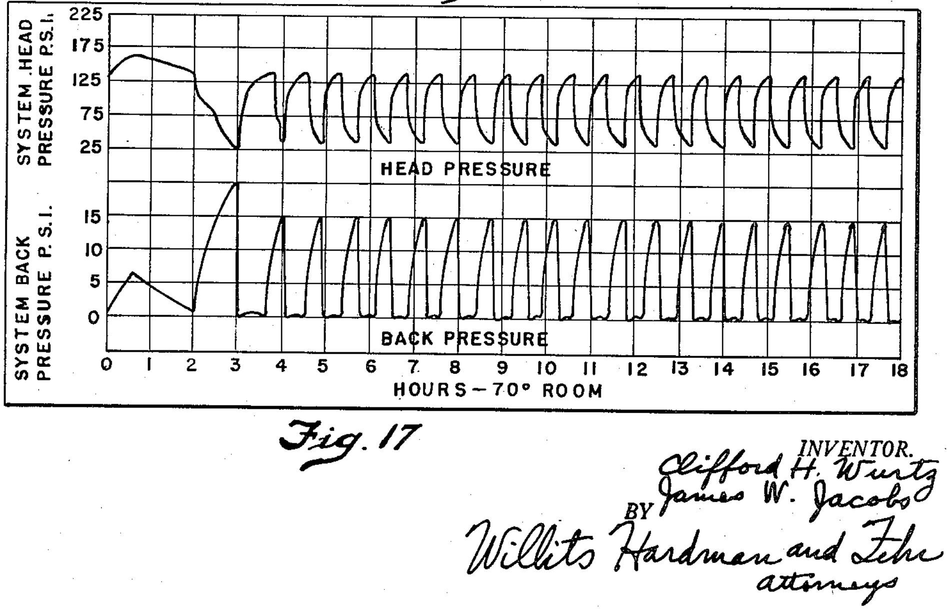
Fig. 17 is a chart showing the typical cycling of the head pressure and back pressure under initial starting conditions and subsequent normal running conditions in a 70° room.

Figs. 15 to 17 show the condenser head pressure variations in 110°, 90° and 70° rooms respectively. These charts illustrate the pressure variations starting with a refrigerator which has been shut down and is loaded according to the standard testing procedures of the National Electrical Manufacturers Association code. The suction or back pressures of the refrigerating system are also plotted on these same charts coordinated with the heat pressure charts. The temperature curves 425, 433 and 435 correspond to the normal back or suction pressure cycles in charts 15, 16 and 17 during the initial pull down and after normal running conditions are reached.

Thus by providing sufficient lubricant accessible to the refrigerant to provide a variable starving action for the supply of refrigerant in the refrigerated plate 90, the variation in the heat leak due to varying room temperatures is substantially compensated for in an extremely simple manner. These values may be found in the following manner. The refrigerator is placed in a 110° room and refrigerant is added to the system until the suction line frosts, then sufficient refrigerant is removed until the suction line is free of frost. The control switch 80 is then set to close at some selected defrosting temperature such as 34° F. The opening point of the switch 80 is then adjusted until the temperature of the frozen food compartment 32 and the packages stored therein are at a temperature between minus 5 and plus 5° F.

The refrigerator is then moved to a 70° room and operated until normal conditions prevail. First, the refrigerant charge is reduced until the refrigerated plate 90 is not fed any substantial amount of liquid refrigerant during the initial portion of the running period so as to provide the projection 431 on the temperature curve in Fig. 14. At this time, a check should be made to see that the packages in the compartment 32 are still in the desired range of plus 5 to minus 5° F. The period of starvation illustrated by the projection 431 is the period used to supply refrigeration to the freezing compartment container 32 sufficient to keep the packages at the desired low temperature without over cooling the food compartment 38. If the food compartment 38 is still too cool more refrigerant is withdrawn from the refrigerating system until the average temperature of the compartment 38 is within a desired range.

The location of the clamped serpentine end portion 370 of the capillary tube 368 upon the refrigerated plate 90 may also be varied. Moving this bulb portion 370 toward the liquid inlet of the refrigerated plate reduces the time that liquid refrigerant is fed to the refrigerated plate 90 during the running cycle. However, experience has shown that the bulb 370 should be at least ¼ of the length of the passage 92 fom its inlet in order to provide sufficient refrigeration of the refrigerated plate 90 in a 90° or a 110° room.

Figure 18:
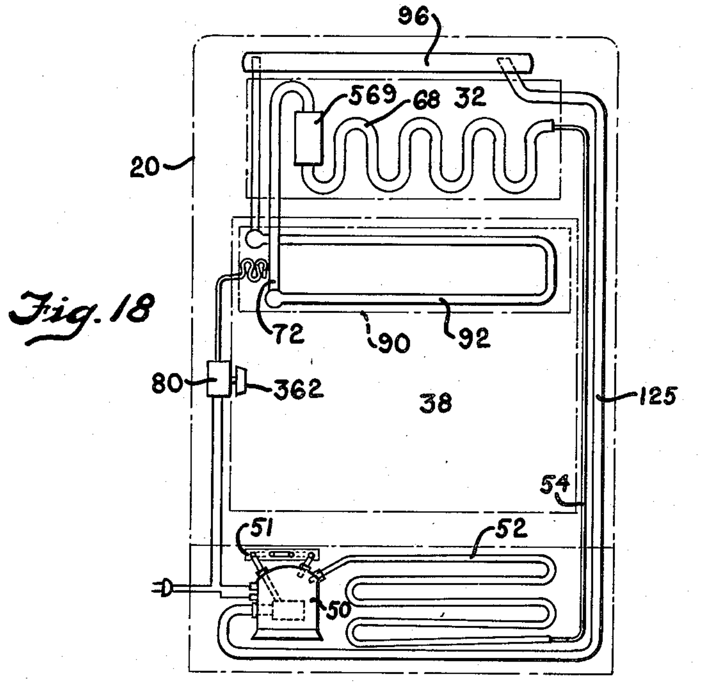
Fig. 18 is a diagrammatic view of a modified form of the invention in which there is provided a disengaging tank between the first stage primary freezing evaporator and the second stage primary refrigerating plate in the food compartment.

Fig. 18 shows a modified form of the invention in which similar parts bear the same reference characters as the corresponding parts in Figs. 1 to 17 inclusive. The description applied to Figs. 1 to 17 also applies to the form shown in Fig. 18 with the following exception. In Fig. 18, the terminal portion of the freezing evaporator, which is in heat exchange relation with the freezing compartment container 32, has its right side portion 68 connected to the bottom of a disengaging tank 569 which serves as a disengaging space and also as a trap for preventing the draining of the tubular freezing compartment evaporator. The top of this tank is connected by the conduit 72 to the bottom of the refrigerated plate 90 as in the previous modification. This form has the same desirable characteristics as the form shown in Figs. 1 to 17. The disengaging tank 569 provides ample space for receiving liquid refrigerant from the refrigerated plate 90 during the idle periods of the motor compressor unit 50.

Figure 19:
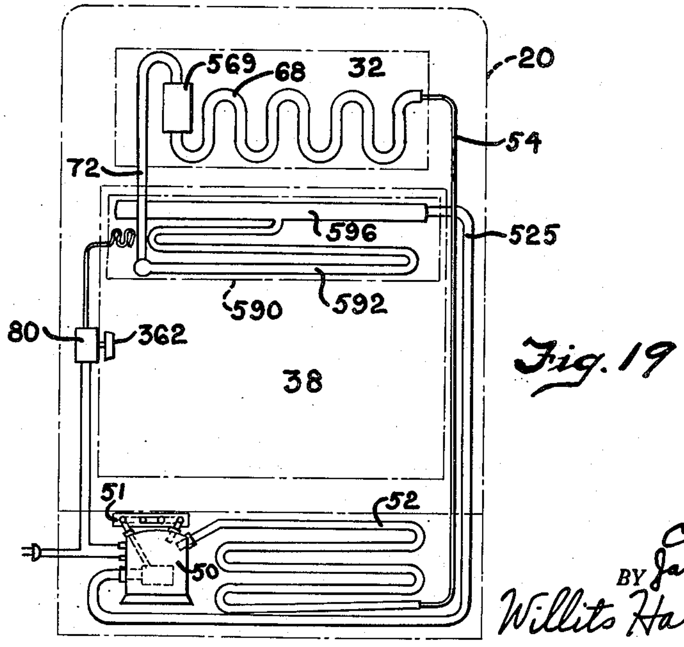
Fig. 19 is a diagrammatic view, similar to Fig. 18, in which the outlet of the refrigerated plate is connected directly to the suction inlet of the compressor.

In Fig. 19 there is shown another modification in which similar parts likewise bear the same reference characters as in the previously described forms and the description thereof likewise applies. This form shown in Fig. 19 differs from Fig. 18 in that the refrigerated plate 590 is provided with a serpentine shaped refrigerant passage 592 which connects directly with the bottom of an accumulator space 596 formed directly in the refrigerated plate 90. The accumulator space 596 also differs from the accumulator 96 in that the inlet connection is made at the bottom of the space and the suction outlet thereof is connected at the end thereof by a suction line 525 which connects to the inlet of the motor compressor unit 50. In both of these forms, many of the details, such as the pans 127 and 129 as well as the secondary circuit which cools them, have been omitted. All of these details however can be included in the forms shown in Figs. 18 and 19 in substantially the same arrangement.

In this system, the construction is simplified because the separate connection between the refrigerated plate 90 and the accumulator 96 is omitted. During the idle period, the refrigerant in the refrigerated plate 590 is returned through the connecting conduits 72 to the disengaging tank 569 by the vapor pressure above the surface of the liquid refrigerant in the passage 592. This assures operation of the refrigerating system in substantially the same manner as explained in connection with Figs. 1 to 17. However, it is more difficult to adjust this system to maintain as low temperatures in the freezing compartment container 32 as are attained with the forms shown in Figs. 1 to 18. The reason for this appears to be that the accumulator 96 considerably assists in the cooling of the container 32.

In Fig. 20 there is shown diagrammatically another modification in which similar parts are designated by the same reference characters and function in the same manner as explained in the previous modifications. In this modification, there is provided a secondary condenser 621 which is clamped to the portion of the tubular primary freezing evaporator between the right side portion 68 and the trap portion 69. The evaporating portion 623 is wrapped around the lower exterior of the liner 38 for cooling the high humidity pans 127 and 129. Liquid refrigerant is fed to the evaporator 623 from the condenser 621 through the supply conduit 625 while the evaporated refrigerant from the secondary evaporator 623 returns to the condenser 621 through the return conduit 627.

Fig. 21 shows another modification in which some of the parts bear the same reference characters and operate in the same manner. Fig. 21 differs from previous forms in that the evaporating portion 723 which is wound about the lower exterior portion of the liner 38 is connected to a secondary condenser 721 which is located in heat exchange relation with the accumulator 96 located in the insulation space adjacent the freezing compartment container 32. The bottom of the condenser 721 is connected to the supply conduit 726 which connects to the bottom of the evaporator 723 while the top of the evaporator 723 is connected by the return conduit 727 to another portion of the condenser 721.

In Fig. 22, there is shown still another modification in which the same bear the same reference characters as in previous modifications and operate similarly. In this particular form, the lower portion of the passage 92 in the refrigerated plate 90 is connected by a refrigerant supply conduit 825 to an accumulator 896 which is located within the insulation space 828 between the back wall of the food compartment liner 38 and the back wall of the outer shell 20. The refrigerated plate 90 is thereby prevented from accumulating liquid refrigerant thereby speeding defrosting during the idle period. The top of this accumulator 896 is connected directly to the suction conduit 125 connecting to the inlet of the motor compressor unit 50.

The bottom of the liner 38 is cooled by a secondary refrigerant evaporator 826 which is wound about the lower exterior portion of the liner 38 for cooling the high humidity pans 127 and 129. The top of this evaporator 823 is connected by the conduit 827 to the upper portion of a secondary refrigerant condenser 821 which is mounted in heat exchange relation with the accumulator 896. This condenser 821 evaporates liquid refrigerant reaching the accumulator 896. The bottom portion of the condenser 821 is connected by a liquid supply conduit 825 with the lower portion of the evaporator 823.

In Fig. 20, the secondary condenser 621 tends to heat the refrigerant leaving the tubular freezing evaporator so as to reduce the amount of liquid refrigerant supplied to the passage 92 in the refrigerated plate 90. In Fig. 21 the secondary condenser 721 evaporates any liquid refrigerant which may collect in the accumulator 96. In Fig. 22 the secondary condenser 821 evaporates the refrigerant which may collect in the accumulator 896. In each of these three modifications, the secondary circuit is used to prevent excess amounts of liquid refrigerant from flowing farther through the refrigerant circuit than is desired.

In accordance with the provisions of rule 78*a*, reference is made to the following prior filed application: S. N. 193,963 filed November 3, 1950.

While the form of embodiment of the invention as herein disclosed constitutes a preferred form, it is to be understood that other forms might be adopted, as may come within the scope of the claims which follow.

What is claimed is as follows:

1. Refrigerating apparatus comprising: a cabinet; a cycling refrigerant liquefying means in said cabinet; a frozen food compartment in said cabinet to be maintained substantially below 32° F. and adapted to be maintained uninterruptedly below 32° F. without defrosting for long periods of time, such as several months, independently of the cycling of said refrigerant liquefying means; an unfrozen food compartment to be maintained substantially above 32° F. in said cabinet; insulation for said compartment including a substantial heat transfer barrier between said compartments; a freezing evaporator in heat exchange with said frozen food compartment; a frosting and defrosting evaporator inside said unfrozen food compartment; refrigerant flow connections providing a circuitous series connection from said refrigerant liquefying means first to said freezing evaporator, thence to said frosting and defrosting evaporator, thence back to said refrigerant liquefying means; the refrigerant connections between the freezing evaporator and the frosting and defrosting evaporator being open and substantially unrestricted, and a thermostatic cycling control having a thermally sensitive element in direct intimate contact with said frosting and defrosting evaporator and having cycling means for starting and stopping said liquefying means, respectively when the temperature of said frosting and defrosting evaporator rises above 32° F. and when it falls below the temperature to be maintained in said frozen food compartment; the combined holdover capacity of said frozen food compartment and said freezing evaporators being sufficiently great in relation to the holdover capacity of said frosting and defrosting evaporator to prevent the temperature of said frozen food compartment from rising above 32° F.

2. Refrigerating apparatus comprising: a cabinet; a cycling refrigerant liquefying means in said cabinet; a frozen food compartment in said cabinet to be maintained substantially below 32° F. and adapted to be maintained uninterruptedly below 32° F. without defrosting for long periods of time, such as several months, independently of the cycling of said refrigerant liquefying means; an individual door for said compartment; an unfrozen food compartment to be maintained substantially above 32° F. in said cabinet; insulation for said compartment including a substantial heat transfer barrier between said compartments; a freezing evaporator in heat exchange with said frozen food compartment; a frosting and defrosting evaporator inside said unfrozen food compartment; refrigerant flow connections providing a circuitous series connection from said refrigerant liquefying means first to said freezing evaporator, thence to said frosting and defrosting evaporator, thence back to said refrigerant liquefying means; the refrigerant connections between the freezing evaporator and the frosting and defrosting evaporator being open and substantially unrestricted, said refrigerant flow connections being constructed to cause liquid refrigerant to be forced by partial evaporation of refrigerant at the start of a defrosting operation from said frosting and defrosting evaporator to said freezing evaporator.

3. Refrigerating apparatus comprising: a cabinet including an outer hermetically sealed casing; a motor compressor unit and a condenser in said cabinet; a frozen food compartment in said cabinet to be maintained substantially below 10° F. without defrosting for long periods of time, such as several months, independently of the cycling of said motor compressor unit; an unfrozen food compartment to be maintained substantially above 32° F. below said frozen food compartment; insulation inside said outer casing and outside and between said compartments, with breathing openings or accesses to said unfrozen food compartment; a freezing evaporator outside and in contact with all of the walls of said frozen food compartment except the door opening; a frosting and defrosting evaporator inside said unfrozen food compartment; refrigerant flow and heat exchange connections between said evaporators and said motor compressor unit and condenser; the refrigerant connections between the freezing evaporator and the frosting and defrosting evaporator being open and substantially unrestricted, and a thermostatic switch controlling the cycling of said motor compressor unit and having a thermostatic bulb in close thermal contact with said frosting and defrosting evaporator, set to start said motor compressor unit when the temperature of said frosting and defrosting evaporator rises above 32° F. and to stop said motor compressor unit when the temperature of said frosting and defrosting evaporator falls below the temperature to be maintained in said frozen food compartment.

4. Refrigerating apparatus including an above freezing food compartment and a below freezing compartment, a thermal heat transfer barrier between said compartments, a refrigerant liquefying means, a freezing evaporating means in heat exchange relation with said below freezing compartment and having its inlet connected to an outlet of said liquefying means, a food compartment evaporating means in heat exchange relation with said food compartment and having its inlet connected to an outlet of said freezing evaporating means, the refrigerant connection between said freezing and food compartment evaporating means being open and substantially unrestricted for refrigerant flow, means for returning evaporated refrigerant from said freezing and food compartment evaporating means to said liquefying means, and thermostatic cycling control means having a thermally sensitive element in direct intimate contact with said food compartment evaporating means having means for preventing the starting of said liquefying means until the food compartment evaporating means reaches a temperature above 32° F. for defrosting said food compartment evaporating means and having means for preventing the stopping of said liquefying means until said food compartment evaporating means is cooled to below freezing temperatures.

5. Refrigerating apparatus including an above freezing food compartment and a below freezing compartment, a thermal heat transfer barrier between said compartments, a refrigerant liquefying means, a freezing evaporating means in heat exchange relation with said below freezing compartment and having its inlet connected to an outlet of said liquefying means, a food compartment evaporating means in heat exchange relation with said food compartment and having its inlet connected to an outlet of said freezing evaporating means, the refrigerant connection between said freezing and food compartment evaporating means being open and substantially unrestricted for refrigerant flow, means for returning evaporated refrigerant from said freezing and food compartment evaporating means to said liquefying means, and thermostatic cycling control means having a thermally sensitive element in direct intimate contact with said food compartment evaporating means having means for preventing the starting of said liquefying means until the food compartment evaporating means reaches a temperature above 32° F. for defrosting said food compartment evaporating means and having means for preventing the stopping of said liquefying means until said food compartment evaporating means is cooled to below freezing temperatures, said below freezing compartment having a sufficiently slower heat leak than said food compartment and said freezing evaporating means having sufficiently greater mass relative to said heat leak than said food compartment evaporating means that said below freezing compartment is maintained at substantially constant sub-freezing temperatures during the cycling of said liquefying means.

6. Refrigerating apparatus including an above freezing food compartment and a below freezing compartment, a thermal heat transfer barrier between said compartments, a refrigerant liquefying means, a freezing evaporating means in heat exchange relation with said below freezing compartment and having its inlet connected to an outlet of said liquefying means, a food compartment evaporating means in heat exchange relation with said food compartment and having its inlet connected to an outlet of said freezing evaporating means, the refrigerant connection between said freezing and food compartment evaporating means being open and substantially unrestricted for refrigerant flow, means for returning evaporated refrigerant from said freezing and food compartment evaporating means to said liquefying means, and thermostatic cycling control means having a thermally sensitive element in direct intimate contact with said food compartment evaporating means having means for preventing the starting of said liquefying means until the food compartment evaporating means reaches a temperature above 32° F. for defrosting said food compartment evaporating means and having means for preventing the stopping of said liquefying means until said food compartment evaporating means is cooled to below freezing temperatures, said evaporating means having a liquid conducting arrangement effective during the off cycle of said liquefying means for conducting liquid refrigerant from the food compartment evaporating means into heat exchange relation with said below freezing compartment.

7. Refrigerating apparatus including an above freezing food compartment and a below freezing compartment, a thermal heat transfer barrier between said compartments, a refrigerant liquefying means, a freezing evaporating means in heat exchange relation with said below freezing compartment and having its inlet connected to an outlet of said liquefying means, a food compartment evaporating means in heat exchange relation with said food compartment and having its inlet connected to an outlet of said freezing evaporating means, the refrigerant connection between said freezing and food compartment evaporating means being open and substantially unrestricted for refrigerant flow, means for returning evaporated refrigerant from said freezing and food compartment evaporating means to said liquefying means, and thermostatic cycling control means having a thermally sensitive element in direct intimate contact with said food compartment evaporating means having means for preventing the starting of said liquefying means until the food compartment evaporating means reaches a temperature above 32° F. for defrosting said food compartment evaporating means and having means for preventing the stopping of said liquefying means until said food compartment evaporating means is cooled to below freezing temperatures, said evaporating means having a liquid conducting arrangement effective during the off cycle of said liquefying means for draining liquid refrigerant from the food compartment evaporating means and conducting the drained liquid refrigerant to the freezing evaporating means.

8. Refrigerating apparatus including an above freezing food compartment and a below freezing compartment, a thermal heat transfer barrier between said compartments, a refrigerant liquefying means, a freezing evaporating means in heat exchange relation with said below freezing compartment and having its inlet connected to an outlet of said liquefying means, a food compartment evaporating means in heat exchange relation with said food compartment and having its inlet connected to an outlet of said freezing evaporating means, the refrigerant connection between said freezing and food compartment evaporating means being open and substantially unrestricted for refrigerant flow, means for returning evaporated refrigerant from said freezing and food compartment evaporating means to said liquefying means, and thermostatic cycling control means having a thermally sensitive element in direct intimate contact with said food compartment evaporating means having means for preventing the starting of said liquefying means until the food compartment evaporating means reaches a temperature above 32° F. for defrosting said food compartment evaporating means and having means for preventing the stopping of said liquefying means until said food compartment evaporating means is cooled to below freezing temperatures, said evaporating means having a liquid conducting arrangement effective during the off cycle of said liquefying means for draining liquid refrigerant from the food compartment evaporating means and conducting the drained liquid refrigerant outside the food compartment.

9. Refrigerating apparatus comprising: a cabinet; a cycling refrigerant liquefying means in said cabinet; a frozen food compartment in said cabinet to be maintained substantially below 32° F. and adapted to be maintained uninterruptedly below 32° F. without defrosting for long periods of time, such as several months, independently of the cycling of said refrigerant liquefying means; an individual door for said compartment; an unfrozen food compartment to be maintained substantially above 32° F. in said cabinet; insulation for said compartment including a substantial heat transfer barrier between said compartments; a freezing evaporator in heat exchange with said frozen food compartment; a frosting and defrosting evaporator inside said unfrozen food compartment; refrigerant flow connections providing a circuitous series connection from said refrigerant liquefying means first to said freezing evaporator, thence to said frosting and defrosting evaporator, thence back to said refrigerant liquefying means; the refrigerant connections between the freezing evaporator and the frosting and defrosting evaporator being open and substantially unrestricted, and a thermostatic cycling control having a thermally sensitive element in direct intimate contact with said frosting and defrosting evaporator and having cycling means for starting and stopping said liquefying means, respectively when the temperature of said frosting and defrosting evaporator rises above 32° F. and when it falls below the temperature to be maintained in said frozen food compartment; the combined holdover capacity of said frozen food compartment and freezing evaporator being sufficiently great in relation to the holdover capacity of said frosting and defrosting evaporator to prevent the temperature of said frozen food compartment from rising above 32° F., the outlet of said freezing evaporating means being in the form of a liquid holding trap with the overflow of the trap serving as the refrigerant connection to the inlet of said food compartment evaporating means, said food compartment evaporating means having its inlet located adjacent the bottom and having its refrigerant space so formed as to drain to said inlet so that whenever the liquefying means is idle so that the inherent rise in gas pressure within the food compartment evaporator means will apply pressure upon the surface of the liquid refrigerant therein to return the liquid to the freezing evaporator through the connection therewith.

10. Refrigerating apparatus comprising: a cabinet; a cycling refrigerant liquefying means in said cabinet; a frozen food compartment in said cabinet to be maintained substantially below 32° F. and adapted to be maintained uninterruptedly below 32° F. without defrosting for long periods of time, such as several months, independently of the cycling of said refrigerant liquefying means; an individual door for said compartment; an unfrozen food compartment to be maintained substantially above 32° F. in said cabinet; insulation for said compartment including a substantial heat transfer barrier between said compartments; a freezing evaporator in heat exchange with said frozen food compartment; a frosting and defrosting evaporator inside said unfrozen food compartment; refrigerant flow connections providing a circuitous series connection from said refrigerant liquefying means first to said freezing evaporator, thence to said frosting and defrosting evaporator, thence back to said refrigerant liquefying means; the refrigerant connections between the freezing evaporator and the frosting and defrosting evaporator being open and substantially unrestricted, and a thermostatic cycling control having a thermally sensitive element in direct intimate contact with said frosting and defrosting evaporator and having cycling means for starting and stopping said liquefying means, respectively when the temperature of said frosting and defrosting evaporator rises above 32° F. and when it falls below the temperature to be maintained in said frozen food compartment; the combined holdover capacity of said frozen food compartment and freezing evaporator being sufficiently great in relation to the holdover capacity of said frosting and defrosting evaporator to prevent the temperature of said frozen food compartment from rising above 32° F., the outlet of said freezing evaporating means being in the form of a liquid holding trap with the overflow of the trap serving as the refrigerant connection to the inlet of said food compartment evaporating means, said food compartment evaporating means having its inlet located adjacent the bottom and having its refrigerant space so formed as to drain to said inlet so that whenever the liquefying means is idle so that the inherent rise in gas pressure within the food compartment evaporator means will apply pressure upon the surface of the liquid refrigerant therein to return the liquid to the freezing evaporator through the connection therewith, the outlet of said food compartment evaporating means being located in the upper portion thereof, and an accumulator located in heat exchange relation with said freezing evaporating means and having its upper portion connected to the outlet of said food compartment evaporating means and to the inlet of said liquefying means.

11. Refrigerating apparatus including an above freezing food compartment and a below freezing compartment, a thermal heat transfer barrier between said compartments, a refrigerant liquefying means, a freezing evaporating means in heat exchange relation with said below freezing compartment and having its inlet connected to an outlet of said liquefying means, a food compartment evaporating means in heat exchange relation with said food compartment and having its inlet connected to an outlet of said freezing evaporating means, means for returning evaporated refrigerant from said freezing and food compartment evaporating means to said liquefying means, and thermostatic cycling control having a thermally sensitive element in direct intimate contact with said food compartment evaporating means having means for preventing the starting of said liquefying means until the food compartment evaporating means reaches a temperature above 32° F. for defrosting said food compartment evaporating means and having means for preventing the stopping of said liquefying means until said food compartment evaporating means is cooled to below freezing temperatures, said refrigerant liquefying means and said evaporating means containing an amount of free refrigerant substantially equal in volume in liquid form to the interior volume of said freezing evaporating means.

12. A refrigerating system including a refrigerant liquefying means, a serially connected open substantially unrestricted primary evaporating means including separate first, second and third stage primary evaporating sections arranged serially in the order named, a cycling control for said liquefying means to provide idle and running periods, said first and third evaporating sections being arranged in heat exchange relation with each other and thermally isolated from said second evaporator section, said cycling control means being responsive solely to the temperature of said second evaporating section.

13. A refrigerating system including a refrigerant liquefying means, a serially connected open substantially unrestricted primary evaporating means including separate first, second and third stage primary evaporating sections arranged serially in the order named, a cycling control for said liquefying means to provide idle and running periods, said first and third evaporating sections being arranged in heat exchange relation with each other and thermally isolated from said second evaporator section, said cycling control means being responsive to the temperature of said second evaporating section and having means for preventing the termination of each idle period and the beginning of each running period until the second evaporating section rises above 32° F.

14. Refrigerating apparatus including an above freezing food compartment and a below freezing compartment to be maintained below a predetermined sub-freezing temperature, a thermal heat transfer barrier between said compartments, a refrigerant liquefying means, a freezing evaporating means in heat exchange relation with said below freezing compartment and having its inlet connected to said liquefying means and having its outlet extending above a major portion of the evaporating space to prevent the gravity drainage of liquid refrigerant therefrom, a food compartment evaporating means in heat exchange relation with said food compartment, said food compartment evaporating means having a preponderant amount of horizontal passage portions relative to vertical passage portions and having its lowermost horizontal passage portion connected to its inlet and its uppermost horizontal passage portion connected to its outlet, an open substantially unrestricted connection connecting the outlet of said freezing evaporating means and the inlet of said food compartment evaporating means, and a thermostatic cycling control means having a thermally sensitive element in direct contact with said food compartment evaporating means having means for preventing the starting of said liquefying means until the food compartment evaporating means reaches a temperature above 32° F. for defrosting said food compartment evaporating means and having means for preventing the stopping of said liquefying means until said food compartment evaporating means is cooled below said predetermined sub-freezing temperature.

15. Refrigerating apparatus including an above freezing food compartment and a below freezing compartment to be maintained below a predetermined sub-freezing temperature, a thermal heat transfer barrier between said compartments, a refrigerant liquefying means, a freezing evaporating means in heat exchange relation with said below freezing compartment and having its inlet connected to said liquefying means and having its outlet extending above a major portion of the evaporating space to prevent the gravity drainage of liquid refrigerant therefrom, a food compartment evaporating means in heat exchange relation with said food compartment, said food compartment evaporating means having an inlet and an outlet, an open substantially unrestricted connection connectig the outlet of said freezing evaporating means and the inlet of said food compartment evaporating means, said food compartment having an inner liner, a secondary refrigerant circuit having an evaporating portion in heat exchange relation with the outer surface of said inner liner and having its condensing portion in heat exchange relation with said food compartment evaporating means, and a thermostatic cycling control means having a thermally sensitive element in direct contact with said food compartment evaporating means having means for preventing the starting of said liquefying means until the food compartment evaporating means reaches a temperature above 32° F. for defrosting said food compartment evaporating means and having means for preventing the stopping of said liquefying means until said food compartment evaporating means is cooled below said predetermined sub-freezing temperature.

16. In combination, a refrigerator cabinet having a below freezing compartment and an above freezing compartment insulated from said below freezing compartment by means of a heat transfer barrier, a refrigerating system including a refrigerant liquefying means, a serially connected open substantially unrestricted primary evaporating means including separate first, second and third stage primary evaporating sections arranged serially in the order named, a cycling control for said liquefying means to provide idle and running periods, said second evaporating section being located in said above freezing compartment, said first and third evaporating sections being located in said below freezing compartment and being arranged in heat exchange relation with each other.

CLIFFORD H. WURTZ.
JAMES W. JACOBS.

References Cited in the file of this patent

UNITED STATES PATENTS

| Number | Name | Date |
|---|---|---|
| 2,136,316 | Philipp | Nov. 8, 1938 |
| 2,330,917 | Philipp | Oct. 5, 1943 |
| 2,442,978 | Jones | June 8, 1948 |
| 2,462,240 | Van Vliet | Feb. 22, 1949 |
| 2,487,182 | Richard | Nov. 8, 1949 |